United States Patent [19]

Aggarwal et al.

[11] 4,279,798

[45] Jul. 21, 1981

[54] POLYDIENE POLYALKYLENE OXIDE BLOCK COPOLYMERS AND THEIR USE AS ALCOHOL HYDROCARBON DISPERSANTS

[75] Inventors: Sundar L. Aggarwal, Akron; Ivan G. Hargis, Tallmadge; Russell A. Livigni, Akron, all of Ohio

[73] Assignee: The General Tire & Rubber Company, Akron, Ohio

[21] Appl. No.: 134,854

[22] Filed: Mar. 28, 1980

[51] Int. Cl.$^3$ .................. C08L 53/00; C08K 5/01; C08K 5/05
[52] U.S. Cl. .................. 260/33.4 R; 260/33.6 R; 260/33.6 UA; 525/385; 525/334
[58] Field of Search ............... 525/187, 385, 404, 334; 260/33.4 R, 33.6 UA

[56] References Cited

U.S. PATENT DOCUMENTS

| | | | |
|---|---|---|---|
| 3,278,459 | 10/1966 | Herold | 260/2 |
| 3,836,600 | 9/1974 | Brewbaker et al. | 260/836 |
| 3,867,295 | 2/1975 | Schwab et al. | 525/385 |
| 3,954,915 | 5/1976 | Schwab et al. | 260/887 |
| 4,039,593 | 8/1977 | Kamienski et al. | 525/385 |
| 4,083,895 | 4/1978 | Nnadi et al. | 525/385 |

Primary Examiner—Carman J. Seccuro

[57] ABSTRACT

A block copolymer of polyalkalene oxide and a polydiene is made by the lithium catalyzed anionic polymerization of a diene followed by polymerization of an alkalene oxide using a double metal cyanide catalyst. The dispersant can be used in forming a crude oil methanol dispersion for transport through unheated pipelines from the North Slope oil fields to Prudhoe Bay.

2 Claims, No Drawings

POLYDIENE POLYALKYLENE OXIDE BLOCK COPOLYMERS AND THEIR USE AS ALCOHOL HYDROCARBON DISPERSANTS

The invention relates to polydiene, polyalkylene oxide block copolymers, a method for making the same, and their use as dispersants in oil/alcohol mixtures.

Block copolymes of polydienes and polyalkylene oxides have found use as low shrink additives for sheet molding compound. See U.S. Pat. No. 3,836,600 Brewbaker et al (1974) for use; and U.S. Pat. No. 3,050,511 Szwarc (1962) for a method of making such polymers. Styrene-butadiene was copolymerized with a complex of n-butyllithium and potassium t-butoxide and then terminated by the addition of ethylene oxide (see Schwab, U.S. Pat. No. 3,954,915). The resulting polymer was treated with acetic acid, filtered and then hydrogenated. The hydrogenated hydroxyl terminated styrene-butadiene copolymer was reacted with potassium t-butoxide and then used to polymerize ethylene oxide. The potassium t-butoxide is initially present as a randomizing agent and is not required. In addition hydrogenation following the complete addition of the polar block is also contemplated. The block copolymers of Schwab are used in fuels and lubricants as multifunctional additives, providing such utility as detergency and viscosity index improvement. While the prior art system of Schwab is useful for its intended purpose, Schwab did not teach a preferred method of making a polymer having a large amount of the 1,4 form of the polydiene or a more efficient method for adding a controlled molecular weight of a polyether segment such as polypropylene oxide.

This invention, as claimed, solves the problems of how to obtain a polydiene containing a major amount of the 1,4 diene segment and an efficient way to produce a controlled molecular weight of the polyether segments. The products produced have an enhanced ability of form a dispersion of methyl alcohol and crude oil, allowing the transport through pipelines, of unheated crude.

The products of the present invention are also contemplated to be useful in forming gasoline-alcohol, diesel fuel-alcohol as well as alcohol with water-crude oil dispersions in the secondary recovery of crude oil from depleted oil wells. The use of fuel dispersions improves octane rating, reduces emissions, runs cooler, and reduces the flammability of the fuel. In some cases fuel cost is also reduced.

Block copolymers of ethylene oxide and butadiene are difficult to prepare with an organolithium initiator, because of the slow propagation rate of ethylene oxide. However, a diene block polymer of butadiene and ethylene oxide can be prepared by first preparing a hydroxyl terminated polybutadiene prepolymer using an organolithium initiator, then adding ethylene oxide using a double metal cyanide catalyst. The double metal cyanide complex catalysts and methods of making the same are disclosed in U.S. Pat. No. 3,278,457 Milgrom (1966), U.S. Pat. No. 3,278,458 Belner (1966), and U.S. Pat. No. 3,278,459 Herold (1966). Various known organolithium initiators are useful in the practice of the present invention.

The first initiator for this reaction is an organolithium compound. The formula for these initiators is $RLi_y$, wherein R is organo, mono- or polyvalent and may be alkyl, alkenyl, aryl, aralkyl, and alkaryl, and may contain from 1 to about 50 carbon atoms; and y is 1 to 10 and preferably 1 or 2. Such initiators as ethyllithium, propyllithium, n-butyllithium, sec-butyllithium, trt-butyllithium, phenyllithium, and benzyllithium can be used in this reaction. Also, lithium initiators containing a dianion, such as isoprene dilithio and alpha-methylstyrene tetramer lead to the formation of the BAB copolymer.

It is understood in anionic polymerization that each molecule of the initiator starts one anionic polymer chain.

The polybutadiene block is first synthesized to give a high content of 1,4-structure, using an organolithium initiator in a non-polar solvent. The terminal carbanion units ($C^-Li^+$) are then derivatized to the carbinol by the addition of ethylene oxide and subsequent ion exchange $H^+$ for $Li^+$. The hydroxyl terminated polybutadiene is then used as an initiator of ethylene oxide using zinc hexacyanocobaltate complex catalyst to form the poly(ethylene oxide) block. Other alkylene oxides, double metal cyanide catalysts and dienes which can be employed in the practice of the present invention are exemplified in the prior art referred to earlier.

The polymeric dispersants of this disclosure are block polymers with a hydrophobic block e.g. polybutadiene connected to one or more hydrophilic blocks e.g. poly(ethylene oxide). The chemical linking of these two incompatible materials can be expected to provide the properties of a nonionic surfactant of the alkyl polyether alcohol types, for example nonylphenoxypolyoxyethylene ethanol:

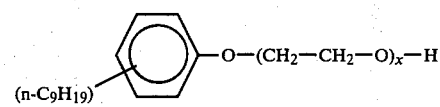

EXAMPLE I

A diblock polymer of butadiene and ethylene oxide containing 50 weight percent ethylene oxide and having a molecular weight of 4,000 was prepared with an organolithium compound (catalyst for butadiene) and a zinc hexacyanocobaltate complex (a catalyst for ethylene oxide).

Polybutadiene was prepared in a 5-gallon reactor by slowly adding butadiene (2,000 g) to a solution of n-butyllithium (1.07 equiv.) in n-hexane (4,000 g) at 60° C. After 3 hours, ethylene oxide (170 g) was charged to the solution of non-terminated polybutadiene over a period of 1.5 hours at 60° C. The product was added to tetrahydrofuran containing a small amount of water, then passed through Amberlyst 15 ion exchange resin containing sulfonic acid groups. The effluent from the ion exchange column was concentrated in a Rotary Evaporator at 93° C., giving a slightly yellow colored viscous liquid. The hydroxyl content of this hydroxyl terminated polybutadiene was 0.496 mM hydroxyl per gram, representing 95% of the expected hydroxyl content of 0.522 mM/g for 1 ethylene oxide unit per chain.

Following the completion of the preparation of the hydroxyl terminated polybutadiene, the poly(ethylene oxide) block was formed by slowly adding ethylene oxide (500 g added in the first 2.5 hours, then 1220 g in the next 16 hours) to 1722 g of the liquid polybutadiene prepolymer in the presence of 2.0 g zinc hexacyanocobaltate complex $\{Zn_3[Co(Cn)_6]_2\} \cdot \{glyme\} \cdot \{ZnCl_2\}$ $\cdot\}_2O\}$. After polymerization for 18.5 hours at 60° C., the product was isolated by dissolution in methylene chloride, followed by filtration and recovery of the polymer in the filtrate by direct drying in a vacuum oven at 65° C. A white, waxy solid was obtained having a hydroxyl content of 0.287 mM OH/g, versus 0.248 mM OH/g expected.

When heated to 50° C., the diblock polymer of butadiene and ethylene oxide (1/1) is insoluble in aliphatic hydrocarbons, soluble in aromatic solvents, such as toluene, and soluble in cyclic ethers, such as tetrahydrofuran. The block polymer forms a stable dispersion in hot methanol. A small amount of this block polymer readily disperses a mixture of hexane in 25% methanol. A control, consisting of a physical mixture of the homopolymers of polybutadiene and poly(ethylene oxide), would not disperse hexane and methanol. In the latter case, the liquids separate allowing the respective homopolymers to be recovered quantitatively from each phase.

An infrared spectrum of the block polymer shows the characteristic absorptions of polybutadiene and poly-ethylene oxide. The material shows two distinct transitions by differential thermal analysis (DTA): a low temperature transition at −98° C. and a crystalline melt transition assignable to poly(ethylene oxide) at 52° C. $^{13}C$ NMR analysis of this polymer showed a resonance at 70.55 ppm (downfield relative to tetramethylsilane, an internal standard) which is representative of poly(ethylene oxide) having sequence lengths of 3 or more units. There is no ethylene glycol in this sample by $^{13}C$ NMR, as indicated by the lack of a resonance in the 63–64 ppm region of the spectrum.

A portion of the product (25 g) was extracted under reflux with 500 ml of methanol in a Soxhlet Extractor. A milky-white colored methanol extract (24.87 g) had an infrared spectrum showing strong absorption bands for both polybutadiene and poly(ethylene oxide).

From the relative intensities of ethylene oxide and butadiene absorption bands, the composition of the polymer extracted by methanol appears to be richer in poly(ethylene oxide) than the parent polymer. Similarly, the polymer obtained by extraction with pentane appears to be richer in polybutadiene than poly(ethylene oxide). Thus, there is no evidence for the presence of homopolymers.

Table I summarizes the composition and molecular weight of the diblock polymer. The microstructure and thermal transition data, given at the bottom of Table I, demonstrate the high 1,4-content of polybutadiene and the crystallinity of poly(ethylene oxide).

TABLE I

Composition and Molecular Structure of Polybutadiene[a]-Poly(ethylene oxide)Diblock Polymer[b]

| Wt. % Ethylene Oxide | | Hydroxyl Content | $\overline{M}_n$ | Estimated by GPC | |
|---|---|---|---|---|---|
| Charged | Found | mM/g | Expected | $\overline{M}_n$ | $\overline{M}_w$ |
| 50 | 52.8 | 0.287 | 4,000 | 4,600 | 5,700 |

[a]Microstructure of polybutadiene portion, 53% trans-1,4,32% cis-1,4, and 15% vinyl.
[b]$T_g$ = −98° C. and $T_m$ = 52° C. by DTA.

The molecular weight (4,600) of the diblock polymer as estimated by High Performance Gel Permeation Chromatography agrees well with the expected value of 4,000 based on grams of diblock polymer divided by moles of carbon-lithium charged. The molecular weight distribution curve shows tailing in the low molecular weight portion of the distribution and a shoulder on the high molecular weight side. The shape of the distribution curve can be explained in part by simultaneous initiation and propagation of butadiene occurring throughout the addition of butadiene.

Preparation of Methanol-Oil Emulsion

Since the diblock polymer of this disclosure is insoluble in crude oil (Prudhoe Bay), starting liquids (toluene or methanol) were used to prepare solutions in toluene or dispersions in methanol of the surfactant prior to mixing with oil. The amount of surfactant was 0.33 wt.% in oil at an oil concentration in methanol of 60 volume percent. An alkylated poly(vinylpyrrolidone), Ganex V-216, from GAF Corporation:

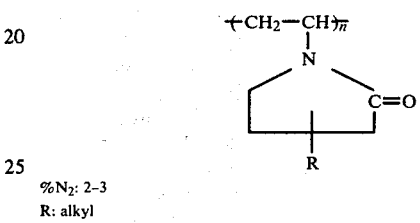

%N$_2$: 2–3
R: alkyl was used for comparative purposes.

Starting liquids were prepared by adding 1 ml of toluene or methanol to 0.02 g of surfactant. The mixture was stirred for 30 minutes at 55° C. When toluene was used as a starting liquid, crude oil (6 g) was added to the solution of surfactant and then methanol (2.3 g) was added next. For the experiments in which methanol (1 ml) was used as a starting liquid, additional methanol (2.3 g) was added to the dispersion, followed by crude oil (6 g). In all experiments, the methanol-oil emulsions were stirred for another 30 minutes and then allowed to stand. The stability of the dispersion was determined from visual observation of the number of layers present after 1 and 24 hours elapsed time.

Evaluation of Diblock Polymer as a Surfactant for Methanol-Oil Emulsions

Diblock polymer formed stable dispersions of methanol-in-crude oil with toluene or methanol as starting liquids, as shown in Table II (W-3 and W-4). 6.0 parts of crude oil was used in each test. The stability of dispersion (W-4) is further demonstrated by phase stability over a period of 6 months. Phase separation occurs within a few minutes when a blend of equivalent amounts of a mixture of homopolymers of butadiene and ethylene oxide of comparable molecular weights is substituted for the diblock polymer. Furthermore, similar behavior was observed when the respective homopolymers alone were evaluated as surfactants.

Ganex V-216 stabilized dispersions of methanol-in-crude oil when dissolved in toluene prior to mixing with crude oil and methanol. However, phase separation occurred when methanol was used as a starting liquid, apparently because of immiscibility.

TABLE II

Evaluation of Various Polymeric Surfactants for Methanol-Oil Emulsions

| Polymer Description | Vial No. | Wt. Surfactant Parts | Starting Liquid Parts | Wt. Methanol Parts | Number of Layers Observed After Standing: 1 hr. | 24 hrs. |
|---|---|---|---|---|---|---|
| Bd/EO (50/50) Diblock | W-1 | 0.02 | None | 3.1 | 2 | 2 |
| | W-2 | 0.002 | None | 3.1 | 2 | 2 |
| | W-3 | 0.02 | Toluene (0.9) | 2.3 | 1 | 1 |
| | W-4 | 0.02 | Methanol (0.8) | 2.3 | 1 | 1 |
| | W-4+2 | 0.02 | Methanol (3.5) | — | 1 | 1 |
| Poly(propylene oxide) ether glycol | C-3 | 0.02 | Methanol (3.5) | — | 2 | 2 |
| Polybutadiene | C-1 | 0.02 | Methanol (3.5) | — | 2 | 2 |
| Blend of Poly(ethylene oxide) and Polybutadiene 50/50 (Control) | C-1+2 | 0.02 | Methanol (3.5) | — | 2 | 2 |
| Ganex V-216 Poly (vinylpyrrolidone) | W-5 | 0.02 | None | 3.1 | 2 | 2 |
| | W-6 | 0.002 | None | 3.1 | 2 | 2 |
| | W-7 | 0.02 | Toluene (0.9) | 2.3 | 1 | 1 |
| | W-8 | 0.02 | Methanol (0.8) | 2.3 | 2 | 2 |

The polymeric dispersant of this invention is equally as effective as Ganex V-216 for dispersing methanol-in-crude oil when toluene is used as a starting liquid. The main advantage of the polybutadiene-poly(ethylene oxide) dispersant is that it can use methanol as a starting liquid because of the hydrophilic character of the poly(ethylene oxide) chain. Substitution of methanol for toluene as a starting liquid decreases the number of components in the dispersion and lowers the cost.

EXAMPLE II

Preparation of Block Polymers Using Complex Cyanide Catalysts

Materials Used 10.39 gms of propylene oxide.

20.2 ml. of n-pentane 13.30 gms. of polybutadiene diol 0.0212 gms. of zinc hexacyanocobaltate (III) glyme complex The above reactants were charged using a procedure for preparing poly(propylene oxide). The reactor was placed in the 50° C. both for three days.

It was found that all of the propylene oxide was consumed in the reaction, moreover, the measured molecular weight of the final polymer, 3020, was in good agreement with the predicted value of 3120, indicating the absence of any additional low molecular weight polymer. Further evidence of the telomerization efficiency of this material was obtained using gel permeation chromatography. These measurements indicated the quantitative addition of the propylene oxide to the polybutadiene and that all of the polybutadiene chains added monomer.

We claim:

1. In a dispersion containing alcohol, and liquid hydrocarbon, the improvement comprising the presence of a small but effective amount to stabilize the dispersion of a block copolymer having within its molecular structure at least two segments, segment A being a polydiene containing a major portion of a 1,4 structure diene, and segment B being a double metal cyanide complex catalyst polymerized alkylene oxide.

2. The composition of claim 1 wherein the alcohol is from 1 to 3 parts of methanol, and the liquid hydrocarbon is 1 to 3 parts of crude oil, and the copolymer is present at a level of 0.01 to 1.6 parts.

* * * * *